(12) United States Patent
Finch et al.

(10) Patent No.: US 9,170,924 B2
(45) Date of Patent: Oct. 27, 2015

(54) ECOSYSTEM CERTIFICATION OF A PARTNER PRODUCT

(71) Applicant: VMware, Inc., Palo Alto, CA (US)

(72) Inventors: Travis Finch, Cedar Park, TX (US); Ahmad Hassan Tawil, Round Rock, TX (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 13/967,285

(22) Filed: Aug. 14, 2013

(65) Prior Publication Data
US 2015/0052499 A1 Feb. 19, 2015

(51) Int. Cl.
G06F 9/44 (2006.01)
G06Q 99/00 (2006.01)
G06F 15/16 (2006.01)
G06F 11/36 (2006.01)

(52) U.S. Cl.
CPC .................. G06F 11/3672 (2013.01)

(58) Field of Classification Search
None
See application file for complete search history.

(56) References Cited

U.S. PATENT DOCUMENTS

| | | | | |
|---|---|---|---|---|
| 5,946,464 A | * | 8/1999 | Kito et al. | 709/202 |
| 6,810,364 B2 | * | 10/2004 | Conan et al. | 702/188 |
| 6,839,647 B2 | * | 1/2005 | Volkov et al. | 702/119 |
| 7,734,790 B1 | * | 6/2010 | Chen | 709/227 |
| 7,743,090 B1 | * | 6/2010 | Gibson et al. | 709/202 |
| 2003/0120829 A1 | * | 6/2003 | Avvari et al. | 709/330 |
| 2006/0282823 A1 | * | 12/2006 | Li et al. | 717/121 |
| 2008/0133616 A1 | * | 6/2008 | Willoughby | 707/202 |
| 2011/0185231 A1 | * | 7/2011 | Balestrieri et al. | 714/27 |

* cited by examiner

Primary Examiner — James D Rutten

(57) ABSTRACT

Exemplary systems and methods certify a partner product for use with an originally developed product. A certification agent within a partner computing system transmits, to a certification server that is external to the partner computing system, an indication that the certification agent is ready to run a certification test of a partner product. The certification agent is configured to run the certification test. The certification agent is communicatively coupled to a testbed operating within the partner computing system and in which the partner product is to be tested. The certification agent receives, from the external certification server, an instruction to implement at least a portion of the certification test. In response to receiving the instruction, the certification agent initiates the portion of the certification test within testbed.

15 Claims, 4 Drawing Sheets

ECOSYSTEM CERTIFICATION OF A PARTNER PRODUCT

FIELD OF THE INVENTION

The various embodiments described herein relate to certification of partner products for use with a product developed by a first, or original, developer, termed an original product. In particular, embodiments relate to a certification test initiated by an external certification server, performed within a partner computing system, and reported through the external certification server.

BACKGROUND OF THE INVENTION

A developer of an original software or hardware product will often invite partner developers ("partners") to develop compatible software and/or hardware products ("partner products") intended to add features and/or functions to the original product or provide a platform or supporting functionality for the original product. The original developer, partners, and end-users who purchase a partner product all want to be assured that the partner product interoperates with the original product. "Certification" of a partner product is a process by which a partner product is tested against standards set by the original product developer to ensure that the partner product interoperates with the original product. Certification comprises testing the interoperation of the partner product with the original product by subjecting the partner product to one or more certification tests.

Current methods of certification of partner products are performed by a partner downloading a software-based certification testing tool and configuring the testing tool for use with the particular partner product and the particular original product for which certification is sought. Configuration of the certification testing tool involves downloading different software plug-ins into the certification testing tool. A different configuration of the certification testing tool may be needed for each partner product and each original product being certified. The partner downloads a test framework for a particular partner product into the certification testing tool. To test a different partner product, a different version of the test framework than the previously downloaded version of the test framework may need to be downloaded depending upon the partner product being certified for use and depending on the original product.

The certification testing system, user interface, and test control logic all reside within the partner computing system. If the partner certification test user discovers a problem during the execution of a certification test, the user will need to call the original developer for assistance, describe the problem as best he can, and try to resolve the issue over the phone or by uploading a test log file.

After a certification test of a partner product has completed, the partner uploads the test log files to the original developer. If the certification process comprises additional tests, then the above certification test process is repeated for each certification test. When all required certification tests are completed, the partner then requests certification of the partner product for use with the original product. The original developer reviews the test log files. If the original developer finds that the results in the test log files indicate that the partner product meets the certification standards for use with the original product, the original developer will issue an indication of certification of the partner product to the partner.

This certification process is repeated for each version of the original developer's product for which the partner wishes to obtain certification. The certification process is also repeated for each particular partner product, and for each version of that product, for which the partner wishes to obtain certification of the partner product. For example, if the original developer has developed a cloud computing file management system having multiple versions, and the partner is a maker of hard disk drives with varying functionalities, the partner would repeat the certification process for each hard disk drive for each of the multiple versions of the cloud computing file management system. A partner may have a certification program manager for one or more types of partner products to be certified. Unless each partner certification test user prepares individual reports, the partner certification program manager will have little or no insight into the progress of certification of the partner's various products being certified. Similarly, an original developer will often have a certification program manager for a broad portion of one or more original products. This broad portion of products may encompass several different partner products and/or multiple versions of the original developer's product. Again, because certification processes are performed within the partner computing system and dependent upon uploaded logs/test results from the partner, the original developer certification program manager will have little or no insight into the progress of certification of partner products for which the original developer certification program manager is responsible.

SUMMARY OF THE INVENTION

Improved systems and methods of certification of a partner product for use with an originally developed product are disclosed. A certification system includes a certification center and a partner certification user computing system. The partner computing system includes a web browser, a deployment broker, a certification agent, and a partner product testbed coupled to the certification agent. The certification agent acts as a proxy between the partner product testbed and the certification center. The certification center is implemented by a server or other computing system that is external to the partner computing system.

The certification center acts as an external portal to initiate and review the progress/results of a test performed within the partner computing system. A partner certification user logs in to the certification center to start a new certification session. The partner certification user provides detailed information to the certification center characterizing the partner product to be tested and identifying the originally developed product. Using the detailed information, the certification center configures a certification agent for downloading via the partner certification user's web browser, or other client tool. A deployment broker plug-in to the certification user's web browser facilitates the downloading and deployment of the configured certification agent into a user computing environment in the partner computing system. In one embodiment, the user computing environment is a virtual computing environment. From within the certification session with the certification center, the user selects a certification test to run. The certification center instructs the certification agent to run the certification. The certification agent, in turn, controls and monitors the partner product testbed in executing the certification test. The partner product testbed generates test results data and transmits the test results data to the certification agent. The testbed may transmit test results data to the certification agent in response to completing the execution of a test step, in response to a buffer condition, such as a percent of remaining buffer space available for test results data, at periodic intervals, or at the completion of the certification test.

The certification agent transmits the certification test results to the certification center. The certification agent may similarly transmit the certification test results data received from the testbed to the certification center in response to the testbed completing the execution of a test step, in response to a buffer condition, such as a percent of remaining buffer space available for test results data, at periodic intervals, at the completion of the certification test, or in response to a request from the certification center for certification test results data. If certification of the partner product requires multiple certification tests, then the above-described process can be repeated for each certification test until all certification tests have been completed. Throughout this disclosure, the term "partner product" is used to mean a product developed by anyone, including the original developer or an affiliate of the original developer, wherein the product is intended to be used in conjunction with the original product. For example, the certification processes described herein may be used by the original developer to ensure that new products developed by the original developer are compatible with the original developer's product. The certification systems and methods disclosed herein have been described in the context of an original product that includes a virtual computing environment and partner products that are to be certified for use with the virtual computing environment. The certification systems and methods described herein are applicable to a wide variety of products, especially computing and electronics products, and are not limited to partner products to be certified for use with a virtual computing environment.

Other features and advantages will be apparent from the accompanying drawings and from the detailed description.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Exemplary embodiments described herein are systems and methods for determining whether a partner product meets certification test criteria for the partner product to be used in conjunction with an originally developed product. Using a web browser, a partner developer certification user logs on to a certification center, typically hosted by the original developer, and starts a new certification session. The certification user provides detailed information to the certification center describing the partner product to be tested and the originally developed product. The certification center configures a certification agent according to the detailed information. The configured certification agent is downloaded by the web browser, or other client tool, to the partner computing system. In one embodiment, certification agent is downloaded as a virtual appliance and deployed on a hypervisor. In another embodiment, certification agent is downloaded and deployed as a standalone application. In yet another embodiment, certification agent is downloaded as a plug-in into an existing software system. An existing software system includes an integrated development environment such as Eclipse IDE. A deployment broker browser plug-in deploys the certification agent into a user computing environment within the partner computing system. For example, the computing environment is a virtual computing environment, and the certification agent is implemented as a configured virtual appliance.

The certification agent acts as a proxy between the certification center and a partner product testbed within the partner computing system. The certification center provides a centralized portal for certification users, managers, etc. to initiate, monitor, and view the results of one or more certification sessions. As a result, the certification center appears to a user to follow the "Software as a Service" model despite running the certification tests within the partner computing system.

Figure 1:
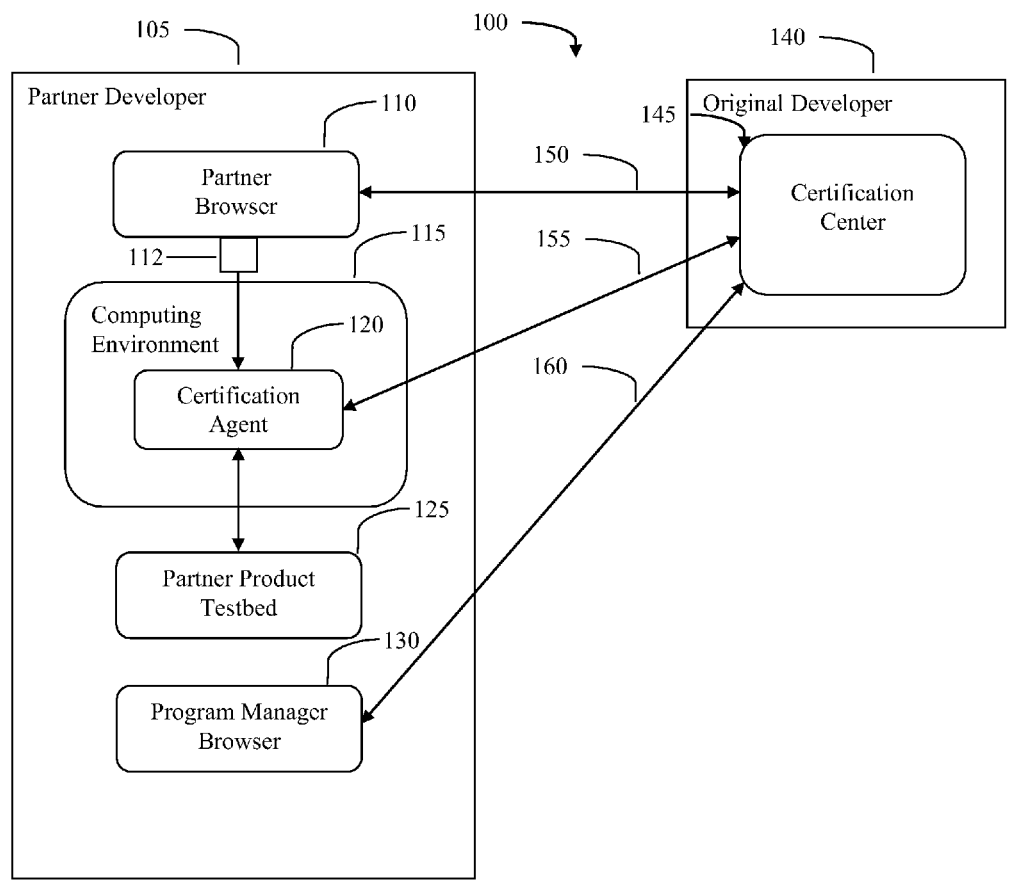
FIG. 1 illustrates the elements of a certification testing system.

FIG. 1 illustrates the elements of certification testing system 100. Certification system 100 includes partner developer computing system 105 and original developer certification system 140, communicatively coupled by a network (e.g., as represented by connections 150/155/160). Original developer certification system 140 includes certification center 145.

Partner developer computing system 105 includes partner browser 110 communicatively coupled 150 to certification center 145. Certification user initiates a certification session with certification center 145 using partner browser 110, via network connection 150. Certification user enters detailed information about the partner product to be tested and the originally developed product using partner browser 110. Partner browser 110 transmits the detailed information to certification center 145.

Certification center 145 uses the detailed information about the partner product and originally developed product to configure and transmit certification agent 120 to computing environment 115 via partner browser 110. Partner browser 110 includes a deployment broker browser plug-in 112 that facilitates downloading and deployment of configured certification agent 120. In one embodiment, computing environment 115 is a virtual computing environment and certification agent 120 is deployed as a virtual appliance.

Once deployed, certification agent 120 is communicatively coupled 155 to certification center 145 and to partner testbed 125. As described further with reference to FIG. 2, certification agent 120 acts as a proxy between certification center 145 and partner product testbed 125. Requests, notifications, test results data, and other information are passed between certification center 145 and partner product testbed 125 by certification agent 120.

Partner product testbed 125 includes, e.g., software, hardware, cabling and such other interfacing equipment as may be needed to test the partner product and interact with certification agent 120 via computing environment 115.

Partner developer computing system 105 can further include program manager browser 130 communicatively coupled 160 to certification center 145. Via program manger browser 130, a program manager can query certification center 145 to obtain certification status of one or more partner products.

Figure 2:
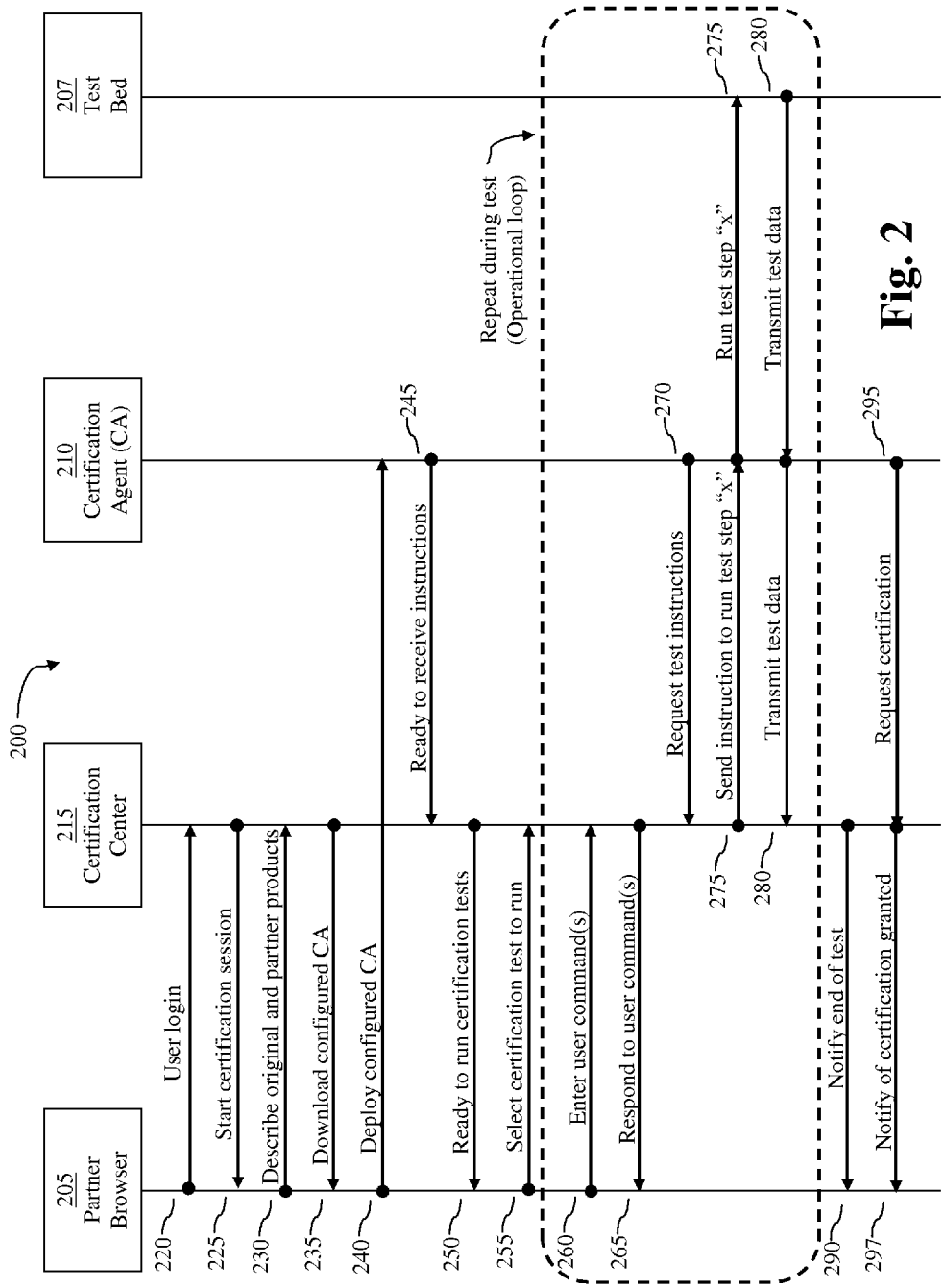
FIG. 2 illustrates an operation sequence diagram of an exemplary method of performing certification testing of a partner product.

FIG. 2 illustrates operation sequence diagram 200 of an exemplary method of performing certification testing of a partner product for use with an originally developed product. In operation 220, a certification user logs in to certification center 215 using partner browser 205. Certification center 215 starts partner product certification session 225. Alternatively, operation 225 opens and resumes a previously-started certification session that was stopped, and saved, for later completion. Using partner browser 205, a certification user enters detailed information 230 characterizing the partner product to be tested and the originally developed product for which the partner product is being tested. For example, partner developer computing system 105 transmits the detailed information to certification server 140. In operation 235, using the detailed information, certification center 215 configures and transmits certification agent 210 to partner browser 205. For example, original developer is a developer of an original product that is an operating system, OS-1, configured to run on Vendor X's hardware. OS-1 includes a storage sub-system, SS-1. OS-1 version 1.5 is the current version of OS-1 for use with Vendor X's hardware version X.3 Partner developer is a manufacturer of mass storage, including hard disks, CD-ROM drives, and disk arrays. Partner developer wants to certify a new hard disk, HD, for use with OS-1 version 1.5, subsystem SS-1, running on hardware X.3 Partner developer enters the information above, and additional information about partner developer product HD, e.g., hard disk capacity, RPM, number of tracks, number of heads, firmware level, model number, and other information that identifies and characterizes the partner developer product to be certified. Original developer product information, e.g. OS-1 version 1.5 and SS-1 is looked up in a database of original developer products. Vendor X's hardware X.3 information may be stored in association with original developer product information, or stored in a separate database associated with original developer product information. Partner developer product HD is looked up in a database of partner developer products. If found, a record of the partner product HD is retrieved. If not found, a new partner product database record is generated for partner developer product HD. Certification server retrieves and configures a certification agent for downloading by partner browser 205. Using the detailed information, above, certification center 215 configures certification agent 210 with the appropriate test software including associated test framework for use with the original product. Certification center 215 then packages the selected test software for downloading, by partner browser 205, as configured certification agent 210. In operation 240, partner browser 205, or other software system, receives and deploys certification agent 210 into computing environment 115 using deployment broker browser plug-in 112. In one embodiment, computing environment 115 is a virtual computing environment and certification agent 210 is deployed as a virtual appliance in the virtual computing environment.

Once certification agent 210 is deployed 240, certification agent 210 acts as a proxy between partner testbed 207 and certification center 215, sending and receiving messages, running certification tests, and transmitting certification test results data to certification center 215. In operation 245, certification agent 210 notifies certification center 215 that deployment of certification agent 210 is complete and certification agent 210 is ready to receive instructions from certification center 215. In one embodiment, certification agent 210 notifies certification center 215 by transmitting a heartbeat signal.

In operation 250, certification center 215 optionally notifies partner browser 205 that certification agent 210 is ready to run certification tests. In one embodiment, from the detailed information about the originally developed product and the partner product to be certified entered by the certification user in operation 230, certification center 215 is able to determine a list of certification tests that are appropriate for the originally developed product and the partner product. Certification center 215 transmits the list of appropriate certification tests to partner browser 205, e.g., within the message 250 that certification center 215 is ready to run tests.

In operation 255, a certification user selects a certification test to run or otherwise transmits a request to initiate a certification test using partner browser 205. The selection is transmitted to certification center 215.

In one embodiment, certification agent 210 is configured to run the selected test. Alternatively, certification agent 210 receives instructions from certification center 215 during the running of the selected test. For example, in operation 270, certification agent 210 requests instructions from certification center 215 regarding running of the selected test. In another embodiment, certification agent 210 requests an entire certification test from certification center 215. In an exemplary embodiment, partner developer computing system that hosts certification agent 210 includes a firewall. Firewall integrity is maintained by certification agent 210 requesting instructions from certification server 215 from behind the firewall, as contrasted with certification agent 210 responding to requests by certification server 215 that certification agent 210 run an instruction. Independent of whether an embodiment comprises a firewall, communication between certification agent 210 and certification center 215 is initiated by certification agent 210 and certification center 215 responds to the contact from certification agent 210. In response to a request for instructions from certification agent 210, in operation 275, certification center 215 transmits an instruction to certification agent 210 to, e.g., run a particular test step, "x." Also in operation 275, certification agent 210 controls and monitors testbed 207 to execute the instruction. As used herein the term, "instruction," refers to a directive to initialize testbed 207, execute a specific certification test step, return a state of certification agent 210 or testbed 207, return certification test results data, pause a certification test, save or return state information of a certification test, terminate a certification test step, reset testbed 207, or other certification test functionality.

In operation 280, testbed 207 transmits certification test results data ("test data") to certification agent 210. Certification agent 210, in turn, transmits the test data to certification center 215. In one embodiment, testbed 207 is configured to transmit test data 280 in response to an instruction to run test a step 275 that generates test data. Alternatively, testbed 207 is configured to transmit test data at regular intervals, or upon meeting a test data storage buffer threshold in testbed 207. Testbed 207 can also transmit test data in response to an instruction in operation 275 directing testbed 207 to return test data. Prior to, and during, the running of the certification test, a certification user can enter command(s) 260 to certification center 215, and receive response(s) to the commands 265 from the certification test center 215. Exemplary user command(s) 260 include setting an operating mode of viewing the certification test progress, requesting test data, pausing the running of a certification test, saving the state of a certification test, causing additional, more detailed commands to be executed than those proscribed by the original product developer, performing configuration or diagnostics on the testbed 207, and requesting on-line assistance from a certification center technician via certification center 215. Viewing process information may include receiving notice that a certification test step has started or completed, an error message or completion code, state information about testbed 207, or test data returned from testbed 207 in operation 280. In one embodiment, test data returned in operation 280 is processed by certification center 215 before presenting the test data, or results derived from the test data, to partner browser 205. Processing test data by certification center 215 may include performing analysis of the data by certification center 215, providing greater information to a certification user than the test data returned in step 280. For example, processing test data by certification center 215 may include addition of comments, suggestions, or test commands by an original developer certification technician. As shown in FIG. 2, operations 260 through 280 are enclosed within a dashed box, indicating that these operations can be repeated any number of times during the execution of the certification test, in an "operational loop." In one embodiment, certification agent 210 requests instructions from certification center 215 in operation 270 at each repetition of operations. The nature of instruction transmitted by certification center 215 in operation 275 may dictate whether, e.g., testbed 207 generates test results data in operation 280. In particular, if the instruction transmitted by certification center 215 does not generate any new test data, operation 280 will not be performed because no new test data was generated by the instruction in operation 275. Alternatively, testbed 207 may buffer test results data, and operation 280 may transmit a portion of test data from testbed 207 to certification agent 210 even though operation 275 did not generate new test results data. Repetition of an operational loop may be run at a pace determined by execution of the operations within the loop ("free-running loop"). Alternatively, execution of the operational loop may be periodic, e.g., at 5 second intervals, or another interval, to balance responsiveness of the operational loop with other processing tasks.

At completion of the selected certification test, in operation 290, certification center 215 notifies the certification user of partner browser 205 that the certification test has ended. In one embodiment, notification that the certification test has ended includes a result of the certification test. In an embodiment, in operation 295, certification agent 210 transmits a request to certification center 215 to grant certification of the partner product, or to perform further processing. In embodiments wherein the partner product being tested comprises software, certification agent 210 may transmit software tested by the certification test to certification center 215 for certification. In an embodiment, in operation 297, a notification that certification has been granted is transmitted to partner browser 205. In embodiments wherein the partner product comprises software, such certification may include an identifier in the software indicating that the software has been certified for use with the original product.

Figure 3:
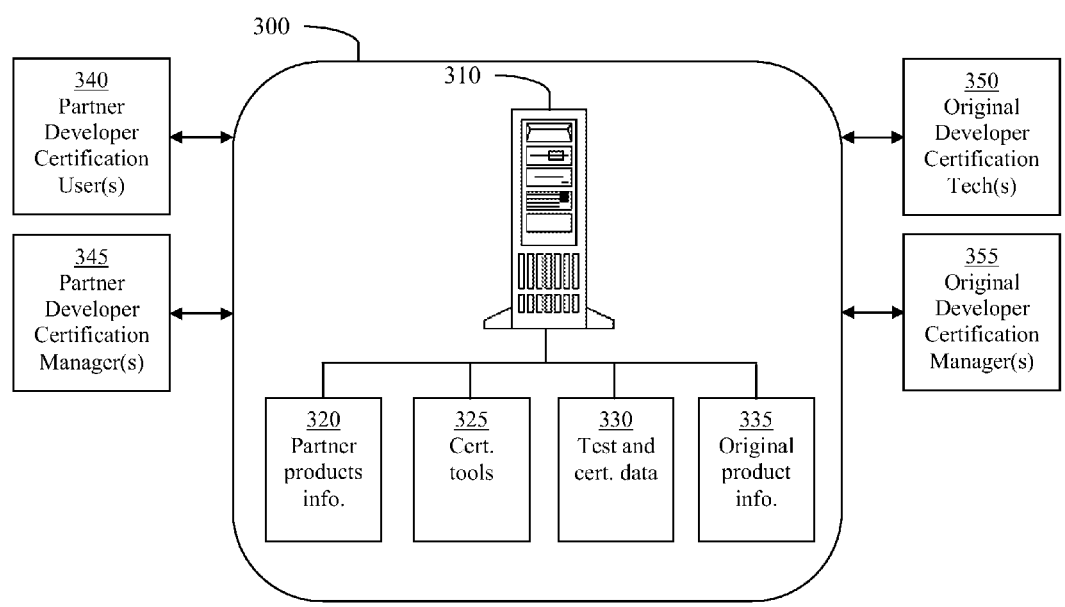
FIG. 3 illustrates the elements of a certification center in a certification testing system.

FIG. 3 illustrates exemplary certification center 300. Certification center 300 is accessible by one or more partner developer certification users 340, one or more partner developer certification managers 345, one or more original developer certification technicians 350, and one or more original developer certification managers 355. Certification center 300 includes at least one certification server 310.

Certification server 310 is coupled to database of partner products 320. Detailed information regarding partner products is entered by a partner developer certification user 340 as described with reference to FIG. 2, element 230. Certification server 310 is further coupled to a database of certification test tools 325. Certification test tools include software modules such as a certification test workbench, deployment broker browser plug-in, test frameworks, and software plug-ins and modules for configuring a certification agent for use with a particular originally developed product and a particular partner developer product. Database of certification tools 325 further includes rules for utilizing certification tools to configure the certification agent and for determining an appropriate suite of certification tests for the particular originally developed product and partner product. For example, database 325 includes a mapping between certification tests, versions of certification test workbench, versions of original products, test frameworks, software plug-ins and modules, etc. Certification server 310 is also coupled to database 335 of detailed information about the original developer's products, including various versions of each product, as appropriate. Additionally, certification server 310 is coupled to database 330 of test results data and certification data for each partner product for any running or completed certification tests. Test results data includes data returned from a partner product testbed in response to an instruction of a certification test. Certification data includes a conclusion made by an original developer certification technician 350, an original developer certification manager 355, or by automated analysis of certification test data by, e.g., certification server 310, that a partner product is, or is not, certified for use with the originally developed product for which the partner product was tested. Test results data and certification data, collectively, "certification information," is specific to a particular partner developer, a particular partner developer product, and a particular original developer product.

Access to database 330 certification information is controlled by certification server 310. Partner developer certification user(s) 340 may access certification information for the particular partner product(s) and particular original products for which a certification user 340 has performed certification testing. Partner developer certification manager(s) 345 may access certification information for the partner products for which the certification manager 345 is assigned responsibility for certification. Both the partner developer certification user 340 and partner developer certification manager 345 can only access certification information for products of the partner developer and not for partner products of other partner developers.

Original developer certification technician 350 may query certification information for which she is responsible. For example, original developer certification technician 350 may be responsible for certification of all hard disk storage devices, for all partner developers, for use with original developer product: version 1.0 of a virtual computing environment. Original developer certification technician 350 could query certification information for all partner developers for all hard disk storage devices for version 1.0 of the virtual computing environment to determine the number and readiness of certifications of hard disk storage devices for version 1.0 of the virtual computing environment. An original developer certification manager 355 may be responsible for the certification of all partner products related to version 1.0 of the virtual computing environment. This original developer certification manager 355 would be able to query certification information for all partner products for all partner developers whose products are being certified for use with version 1.0 of the virtual computing environment.

Original developer certification technician 350 can additionally assist a partner developer certification user 340 resolving issues discovered by running a certification test. As described above with reference to FIG. 2, element 280, test results data is transmitted to certification center 305. Test results data can include error codes, completion codes, testbed state, certification agent state, and other information that an original developer certification technician 350 can use to diagnose an issue discovered by running a certification test. Certification server 310 can also trap test results data, detect an issue within the test data, and provide potential solution suggestions to partner developer certification user 340, including a suggestion to request the assistance of original developer certification technician 350 in resolving the issue.

Figure 4:
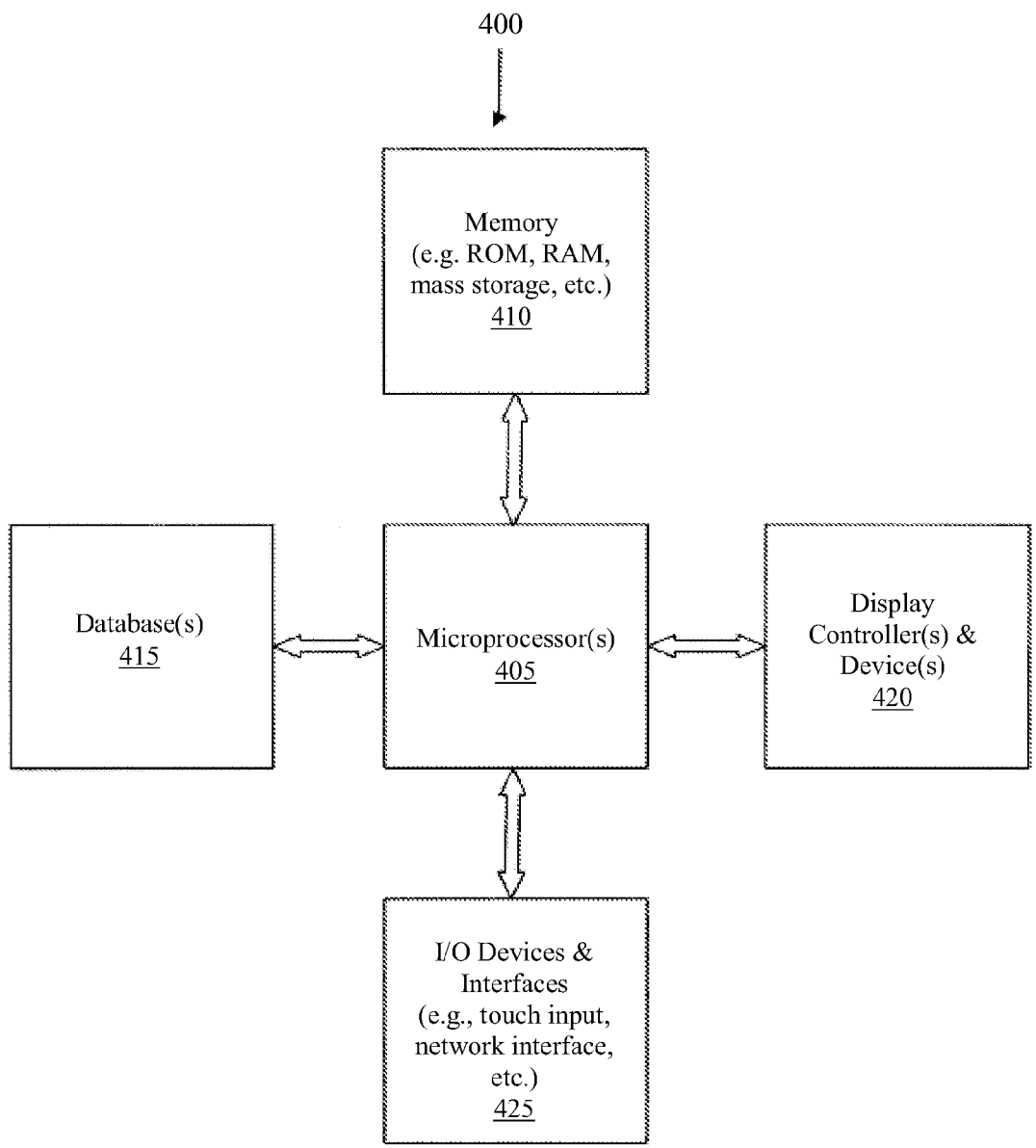
FIG. 4 illustrates the elements of a computing system for use in the certification testing system.

FIG. 4 illustrates, in block diagram form, exemplary processing system 400 for use in a certification testing system as described above. Processing system 400 includes memory 410 which is coupled to microprocessor(s) 405. Memory 410 may be used for storing data, databases, metadata, and programs for execution by the microprocessor(s) 405. Memory 410 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 410 may be internal or distributed memory.

Processing system 400 also includes one or more input or output ("I/O") devices and interfaces 425 which are provided to allow a user to provide input to, receive output from, and otherwise transfer data to and from the system. I/O devices 425 may include a mouse, keypad or a keyboard, a touch panel or a multi-touch input panel, camera, optical scanner, network interface, modem, other known I/O devices or a combination of such I/O devices. I/O devices and interfaces 425 may also include a port, connector for a dock, or a connector for a USB interface, FireWire, Thunderbolt, Ethernet, Fibre Channel, etc. to connect the processing system 400 with another device, external component, or a network. Exemplary I/O devices and interfaces 425 also include wireless transceivers, such as an IEEE 802.11 transceiver, an infrared transceiver, a Bluetooth transceiver, a wireless cellular telephony transceiver (e.g., 2G, 3G, 4G, etc.), or another wireless protocol to connect processing system 400 with another device, external component, or a network and receive stored instructions, data, tokens, etc. It will be appreciated that one or more buses, may be used to interconnect the various components described above.

Processing system 400 also includes database(s) 415, which may include dedicated high-speed storage devices, a disk array, database management software, an indexer, and database optimization tools. Database(s) 415 are coupled to microprocessor(s) 405 and, thereby, to I/O devices and interfaces 425 including, e.g., a network interface coupled to a network (not shown). In one embodiment, database(s) 415 are an exemplary representation of one or more of databases 320, 325, 330, and 335 described above with reference to FIG. 3. Remote users can access the database(s) 415 via network access. Display controller and display device 420 provides a visual user interface for the user.

Data processing system 400 is an exemplary representation of one or more of certification servers 310 within a certification center 300, as described with respect to FIG. 3, above. Data processing system 400 is further an exemplary representation of one or more devices that make up partner developer computing system 105, as described with respect to FIG. 1, above. Data processing system 400 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, data processing system 400 may be a network computer, server, or an embedded processing device within another device or consumer electronic product. As used herein, the terms computer, device, system, processing system, processing device, and "apparatus comprising a processing device" may be used interchangeably with data processing system 400 and include the above-listed exemplary embodiments.

It will be appreciated that additional components, not shown, may be part of processing system 400, and, in certain embodiments, fewer components may also be used in processing system 400. It will be apparent from this description that aspects of the inventions may be embodied, at least in part, in software. That is, the computer-implemented method(s) of FIG. 2 may be carried out in a processing system 400 in response to its processor(s) or processing system executing sequences of instructions contained in a memory or other non-transitory machine-readable storage medium. The software may further be transmitted or received over a network (not shown) via network interface device 425. In various embodiments, hardwired circuitry may be used in combination with the software instructions to implement the present embodiments. Thus, the techniques are not limited to any specific combination of hardware circuitry and software, or to any particular source for the instructions executed by processing system 400.

The instructions executed by the processing system may be embodied in a non-transitory computer-readable medium including an article of manufacture. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A computer-implemented method comprising:
    transmitting, by a certification agent within a partner computing system to a certification server that is external to the partner computing system, a heartbeat signal including an indication that the certification agent is ready to run a certification test of a partner product, wherein the certification agent is configured to run the certification test, the certification agent is communicatively coupled to a testbed operating within the partner computing system and in which the partner product is to be tested, wherein the certification agent is configured by the certification server in response to input received by the certification server from the partner computing system, the input characterizing the partner product and an originally developed product;

receiving, by the certification agent from the external certification server, an instruction to implement at least a portion of the certification test, wherein the instruction includes a directive to execute the portion of the certification test;

initiating, by the certification agent, the portion of the certification test within the testbed in response to receiving the instruction;

receiving, by the certification agent from the testbed, certification test results data; and transmitting, by the certification agent to the certification server, at least a portion of the certification test results data.

2. The method of claim 1, wherein the partner product comprises software and the certification agent transmits the partner product software to the certification server for processing after completion of the certification test.

3. The method of claim 1, wherein the certification test results data is received while the certification test is running and prior to completion of the certification test.

4. The method of claim 1, wherein the configured certification agent is downloaded to the partner computing system from the certification server in response to the input from the partner computing system.

5. The method of claim 4, wherein the partner computing system comprises a virtual computing environment and the certification agent comprises a virtual appliance.

6. A non-transitory computer-readable medium programmed with executable instructions that, when executed, implement a method comprising:

transmitting, by a certification agent within a partner computing system to a certification server that is external to the partner computing system, a heartbeat signal including an indication that the certification agent is ready to run a certification test of a partner product, wherein the certification agent is configured to run the certification test, the certification agent is communicatively coupled to a testbed operating within the partner computing system and in which the partner product is to be tested, wherein the certification agent is configured by the certification server in response to input received by the certification server from the partner computing system, the input characterizing the partner product and an originally developed product;

receiving, by the certification agent from the external certification server, an instruction to implement at least a portion of the certification test, wherein the instruction includes a directive to execute the portion of the certification test;

initiating, by the certification agent, the portion of the certification test within the testbed in response to receiving the instruction;

receiving, by the certification agent from the testbed, certification test results data; and transmitting, by the certification agent to the certification server, at least a portion of the certification test results data.

7. The computer-readable medium of claim 6, wherein the partner product comprises software and the certification agent transmits the partner product software to the certification server for processing after completion of the certification test.

8. The computer-readable medium of claim 6, wherein the certification test results data is received while the certification test is running and prior to completion of the certification test.

9. The computer-readable medium of claim 6, wherein the configured certification agent is downloaded to the partner computing system from the certification server in response to the input from the partner computing system.

10. The computer-readable medium of claim 9, wherein the partner computing system comprises a virtual computing environment and the certification agent comprises a virtual appliance.

11. A system, comprising:
a processing device programmed with executable instructions that, when executed, perform a method comprising:

transmitting, by a certification agent within a partner computing system to a certification server that is external to the partner computing system, a heartbeat signal including an indication that the certification agent is ready to run a certification test of a partner product, wherein the certification agent is configured to run the certification test, the certification agent is communicatively coupled to a testbed operating within the partner computing system and in which the partner product is to be tested, wherein the certification agent is configured by the certification server in response to input received by the certification server from the partner computing system, the input characterizing the partner product and an originally developed product;

receiving, by the certification agent, from the external certification server, an instruction to implement at least a portion of the certification test, wherein the instruction includes a directive to execute the portion of the certification test;

initiating, by the certification agent, the portion of the certification test within the testbed in response to receiving the instruction;

receiving, by the certification agent from the testbed, certification test results data; and transmitting, by the certification agent to the certification server, at least a portion of the certification test results data.

12. The system of claim 11, wherein the partner product comprises software and the certification agent transmits the partner product software to the certification server for processing after completion of the certification test.

13. The system of claim 11, wherein the certification test results data is received while the certification test is running and prior to completion of the certification test.

14. The system of claim 11, wherein the configured certification agent is downloaded to the partner computing system from the certification server in response to the input from the partner computing system.

15. The system of claim 14, wherein the partner computing system comprises a virtual computing environment and the certification agent comprises a virtual appliance.

* * * * *